(12) United States Patent
Liu et al.

(10) Patent No.: US 9,841,541 B2
(45) Date of Patent: Dec. 12, 2017

(54) LUMINANCE ENHANCEMENT FILM HAVING A SUBSTRATE INCORPORATION DISPERSED PARTICLES FOR DIFFUSION

(71) Applicant: UBRIGHT OPTRONICS CORPORATION, Dasi Town, Taoyuan County (TW)

(72) Inventors: Nan-I Liu, Dasi Town (TW); Han-Tsung Pan, Dasi Town (TW)

(73) Assignee: UBright Optronics Corporation, Taoyuan (TW)

( * ) Notice: Subject to any disclaimer, the term of this patent is extended or adjusted under 35 U.S.C. 154(b) by 357 days.

(21) Appl. No.: 14/515,515

(22) Filed: Oct. 16, 2014

(65) Prior Publication Data
US 2015/0029729 A1    Jan. 29, 2015

Related U.S. Application Data

(63) Continuation-in-part of application No. 12/455,021, filed on May 26, 2009, now Pat. No. 8,899,768.

(60) Provisional application No. 61/128,813, filed on May 23, 2008.

(51) Int. Cl.
| | |
|---|---|
| *G02B 5/02* | (2006.01) |
| *G02B 3/00* | (2006.01) |
| *F21V 8/00* | (2006.01) |
| *G02B 5/00* | (2006.01) |
| *G02B 5/04* | (2006.01) |
| *G02F 1/1335* | (2006.01) |

(52) U.S. Cl.
CPC ........... *G02B 5/0231* (2013.01); *G02B 3/005* (2013.01); *G02B 5/0221* (2013.01); *G02B 5/0242* (2013.01); *G02B 5/0278* (2013.01); *G02B 5/045* (2013.01); *G02B 6/0051* (2013.01); *G02B 6/0053* (2013.01); *G02F 2001/133507* (2013.01); *G02F 2001/133607* (2013.01)

(58) Field of Classification Search
None
See application file for complete search history.

(56) References Cited

U.S. PATENT DOCUMENTS

| | | | | |
|---|---|---|---|---|
| 5,852,514 A | * | 12/1998 | Toshima | G02B 5/0231 359/599 |
| 2009/0237769 A1 | * | 9/2009 | Hakii | C25D 7/00 359/270 |
| 2009/0279175 A1 | * | 11/2009 | Laney | G02B 5/0226 359/599 |

* cited by examiner

*Primary Examiner* — Sharon Payne
(74) *Attorney, Agent, or Firm* — Min-Lee Teng; Litron Patent & Trademark Office

(57) ABSTRACT

The present invention discloses a light redirecting film. The light redirecting film comprises a support substrate and an optical substrate. The support substrate comprises a unitary body, wherein the unitary body has a first surface and a second surface opposite to the first surface. The optical substrate has a third surface and a fourth surface opposite to the third surface, wherein the fourth surface is a structured surface, and the second surface of the unitary body faces the third surface of the optical substrate. A plurality of particles are disposed in a region below the first surface of the unitary body, wherein the thickness of the region is smaller than the thickness of the unitary body.

20 Claims, 9 Drawing Sheets

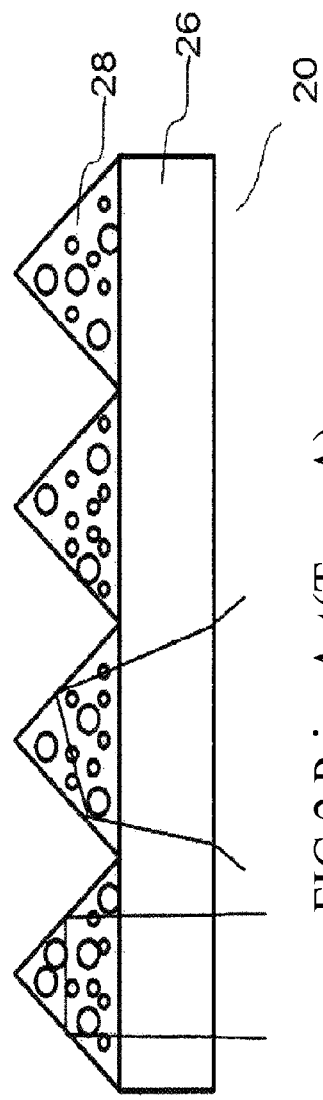
FIG.2 Prior Art(Type-A)
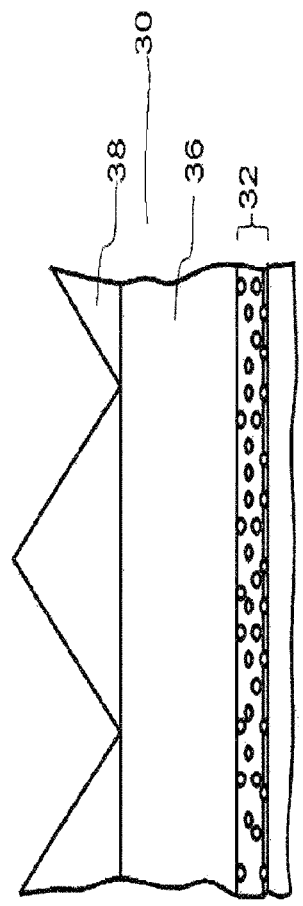
FIG.3 Prior Art(Type-B)

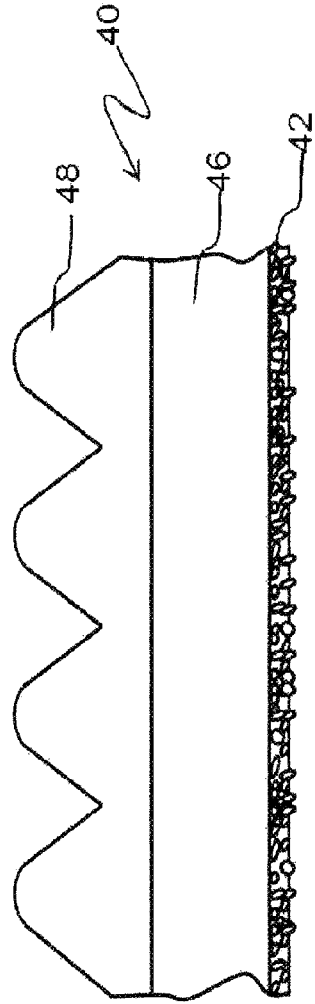
FIG.4 Prior Art(Type-B)
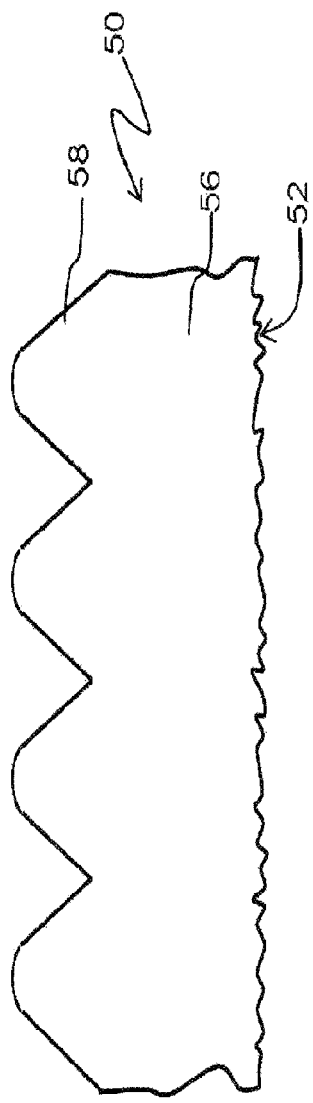
FIG.5 Prior Art(Type-C)

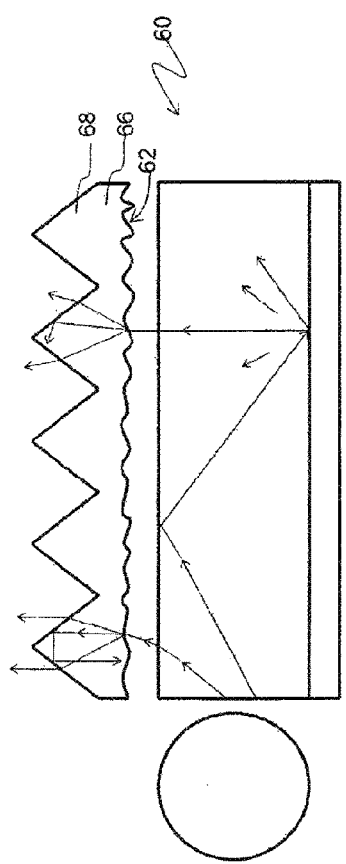
FIG.6 Prior Art(Type-C)
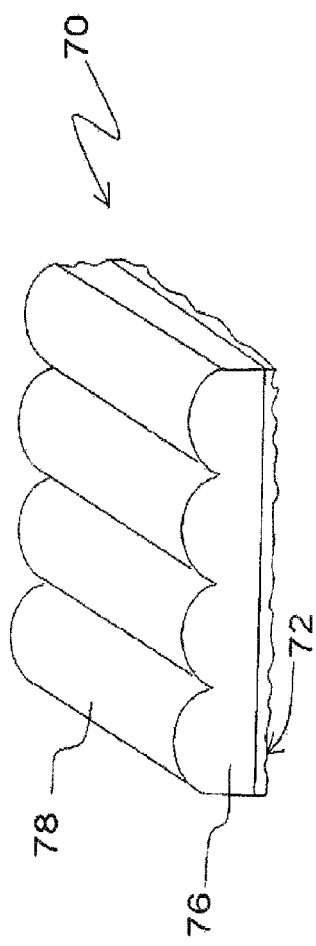
FIG.7 Prior Art(Type-D)

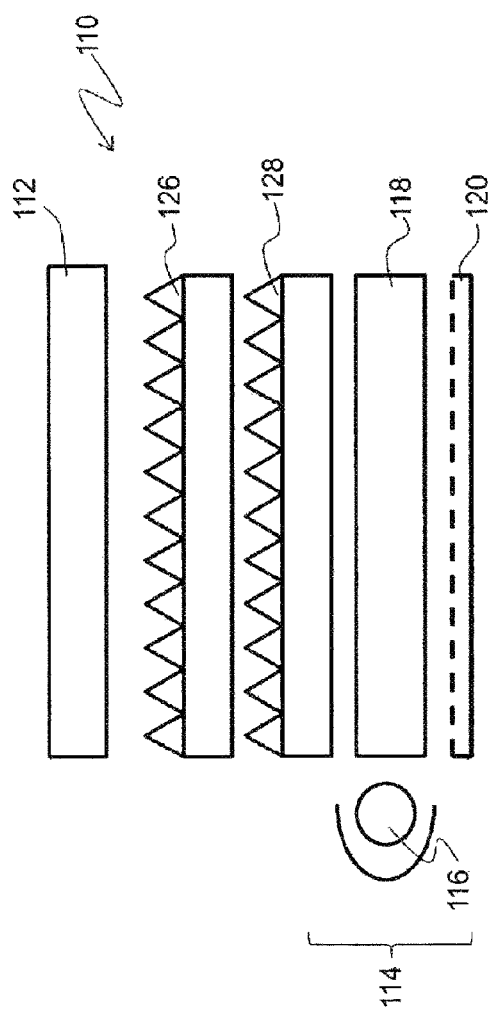
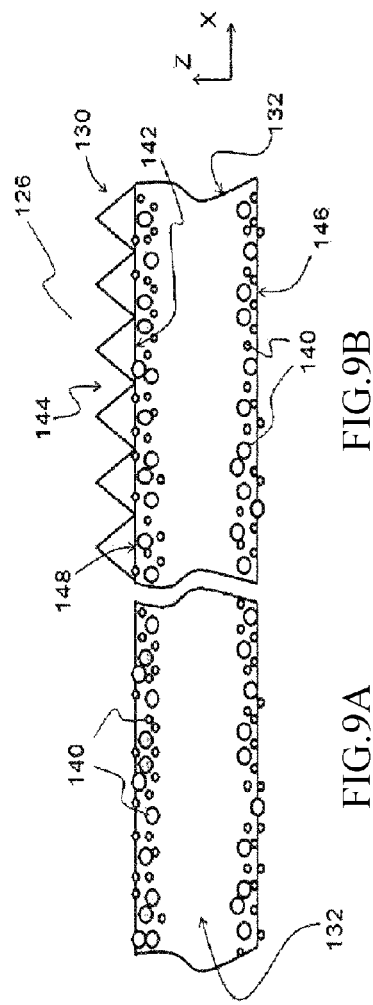

LUMINANCE ENHANCEMENT FILM HAVING A SUBSTRATE INCORPORATION DISPERSED PARTICLES FOR DIFFUSION

This application is a continuation-in-part of U.S. patent application Ser. No. 12/455,021 filed on May 26, 2009, which claims priority of U.S. Provisional Application Ser. No. 61/128,813 filed on May 23, 2008. All of these applications are incorporated by referenced herein in their entirety.

BACKGROUND OF THE INVENTION

1. Field of the Invention

The present invention relates to optical substrates having a structured surface, particularly to optical substrates for brightness enhancement, and more particularly to brightness enhancement substrates for use in flat panel displays having a planar light source.

2. Description of Related Art

Flat panel display technology is commonly used in television displays, computer displays, and handheld electronics (e.g., cellular phones, personal digital assistants (PDAs), etc.). Liquid crystal display (LCD) is a type of flat panel display, which deploys a liquid crystal (LC) module having an array of pixels to render an image. Referring to FIG. 1, a common backlight apparatus 10 for LCD comprises a reflector 11, a light guide 12, a light source 13, various optical films including lower diffuser sheet 14, two crossed brightness enhancement films 15 (e.g., two sheets having similar surface structures, with the sheets offset by 90 degrees about an axis perpendicular to the plane of the sheets), and an upper diffuser 17.

The brightness enhancement films 15 use micro-structures to direct light along the viewing axes (i.e., normal to the display), which enhances the brightness of the light viewed by the user of the display and which allows the system to use less power to create a desired level of on-axis illumination. Heretofore, brightness enhancement films have a light input surface that is smooth, through which light enters from the backlight module, and a structured light emitting or output surface provided with micro-structures (e.g., prisms, lenticular lenses or pyramids). The micro-structures provided at the light emitting surface changes the angle of the film/air interface for light rays exiting the films and causes light incident obliquely at the light input surface of the films to be redistributed in a direction more normal to the light emitting surface of the brightness enhancement films.

The brightness enhancement films may be in the form of micro-prismatic sheets. The composition of a micro-prismatic sheet (such as 3M™ prismatic brightness enhancement films) generally comprises two layers, including a PET substrate 16 and a structured layer 18 (e.g., an acrylic layer) having micro-prism structures. The function of the structured layer 18 having a light output surface with micro-prism structures is to collect the light toward the viewer after being scattered by the lower diffuser 14. The PET substrate 16 is a relatively stronger layer that supports the relatively weaker micro-prism layer 18.

It has been proposed to apply one multifunctional film to replace two or three optical films mentioned above. The multifunctional film needs to achieve both functions of light enhancement and the diffusion function of upper/lower diffuser. Heretofore, various approaches had been described in the prior art.

FIG. 2 illustrates a prior art "Type-A" multifunctional film 20. Particles are added to the acrylic prism layer 28 supported by the substrate 26. (See, for example, U.S. Patent Publication No. US2007/0121227.)

FIGS. 3 and 4 illustrate prior art "Type B" multifunctional films. For the multifunctional film 30 illustrated in FIG. 3, a separate coating 32 of a resin containing particles/beads is applied to the bottom surface of the substrate 36 that supports the prism layer 38. Similarly, in FIG. 4, a separate coating 42 of particles are applied to the bottom surface of the substrate 46 that supports the structured layer 48. (See, for example, U.S. Pat. Nos. 5,995,288, 6,147,804, 6,333,817, 6,560,023, 6,700,707, 6,825,984, 6,280,063, JP3968155, JP3913870, and JP3860298.) The Type-B multifunctional film is generally made by depositing an UV curable resin onto the PET substrate and then embossing with a master mold (see, e.g., U.S. Pat. No. 5,183,597) to form the structured layer, and using a conventional solvent casting method to form the additional layer resin layer having particles.

FIG. 5 illustrates a prior art "Type C" multifunctional film 50, which has structured surface 58 and diffusing surface 52 integrally formed on top and bottom sides of a substrate sheet 56. The structured surface 58 and diffusing/scattering surface 52 may be produced by extruding or calendaring the sheet 56 between two rolls or belts with different patterns corresponding to the structured surface 58 and diffusing/scattering surface 52. U.S. Pat. No. 6,280,063 discloses hot embossing micro-prisms to form the structured surface 58 and the diffusing/scattering surface 52 on extruded sheet 56.

U.S. Pat. No. 5,598,280 discloses another example of a Type-C multifunctional film 60, in which a light-diffusing surface 62 is free from light diffusing agent particles. The surface 58 having prism structures with projections are integrally formed with the light-diffusing surface 62 at the back surface of the substrate material 66.

U.S. Pat. No. 5,598,280 also discloses an alternate embodiment, a Type-D multifunctional film 70, in which surface micro-prism projections 78 are formed on the top surface of the substrate 76, integrally with forming the light-diffusing surface of a separate coating layer 72 after it has been applied to the back surface of substrate 76.

The multifunctional sheets mentioned above all have their shortcomings. In particular, optical coupling effect (e.g., the presence of Newtonian rings) is the primary problem with the type-A sheets due to their flat, non-structured bottom surface. The type-B and type-D sheets all have to be made with a multiple-pass process, which makes them more susceptible to defect formation, not to mention increasing production costs. For manufacturing type-C sheets, due to the nature of extrusion processes and the single sheet of material configuration, it is more difficult to make different structures on both side of the sheet simultaneous, and the light enhancing and diffusing capabilities at the respective sides of the single layer configuration is generally less than that of multi-layer configuration.

What is needed is optical structure that both enhances brightness and provides effective diffusion, and overcoming the shortcomings of the prior art multifunctional optical sheet.

SUMMARY OF THE INVENTION

The present invention is directed to a luminance enhancement film having a built-in light diffusing structure. The inventive luminance enhancement film comprises an optical substrate that possesses a structured surface that enhances luminance or brightness, and a support substrate that incorporates a dispersion of particles for light diffusion. In accordance with the present invention, a separate particle layer is not required in addition to the support substrate layer. The particles are integrated in the unitary body of the support substrate layer.

In one aspect of the present invention, the particles are dispersed near at least one of the planar surfaces of the support substrate (i.e., the light input surface light output surface or both of the support substrate. The extent of particles dispersion into the surface of the support substrate is significantly less than the thickness of the support substrate. The region of particles at the surface of the support substrate is of a thickness on the order of the particle size. In one embodiment, the thickness of the particle region is less than the average size of the particles (i.e., the particles protrude the surface of the support substrate).

All of the particles may be embedded below the surface of the support substrate (i.e. all of the particles are disposed in a region below the surface of the support substrate, wherein the thickness of the region is smaller than the thickness of the support substrate), or some of the particles may protrude above the surface of the support substrate. In one embodiment of the present invention, the support substrate contains particles or beads that are dispersed only close to its surface and form protrusions at the surface (i.e., the particle dispersed surface is not smooth). The particles may be dispersed on one side or both planar sides of the support substrate.

The particles and beads in the support substrate can be inorganic or organic material, or a combination mixture of both. The shape of the particles may be regular, irregular, symmetrical or non-symmetrical, having random or specific geometrical shapes (e.g., spherical, ellipsoidal, rhomboidal, disc, hollow or exotic shapes). The surface of the particles may be finished, e.g., polished, matte, painted, or coated.

The characteristic size of particles and beads does not have to be uniform. All particles may be generally or substantially the same size, or have random sizes, or with a particular size distribution profile across the substrate and/or in depth in reference to the support substrate surface. In addition to particle size distribution, the density of particles can be evenly distributed across the surface of the support substrate or be distributed randomly across the surface of the support substrate, or distributed with varying particle density profiles across the surface of the support substrate. In the alternate or in addition, the particles can be evenly distributed in depth near the surface of the support substrate or be distributed randomly in depth near the surface of the substrate, or distributed with varying particle density profiles in depth near the surface of the support substrate. Further, vary density profiles may include particle density being higher closer to the surface than the interior of the substrate, or vice versa.

The multifunctional luminance enhancement sheet made with a built-in light diffusing surface in the support substrate can reduce the effect of the Newtonian rings. This is an advantage over the prior art Type-A prism multifunctional luminance enhancement sheet. One advantage of this invention over the Type-B and Type-D sheets is that it eliminates the need of an extra coating layer. The present invention avoids extrusion process and a single material configuration, an advantage of present invention over Type-C sheet. Using particles dispersed in the support substrate instead of forming light-diffusing surface on a separate base layer attached to the support substrate, the chance for light to bump into particles and being refracted is reduced, thereby improves over Type-D sheets.

Another advantage of the present invention is that it reduces the thickness of multifunction sheet and eventually the thickness of the backlight structures, which is becoming increasingly important in the design of display devices.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 2 to 7 schematically illustrate the structures of various prior art multifunctional films.

FIG. 8 schematically illustrates the structure of an LCD having a luminance enhancement film in accordance with one embodiment of the present invention.

FIG. 9A is a schematic sectional view of a support substrate incorporating a dispersion of particles, in accordance with one embodiment of the present invention;

FIG. 9B is a schematic sectional view of a luminance enhancement film incorporating the support substrate of FIG. 9A, in accordance with one embodiment of the present invention.

DETAILED DESCRIPTION OF THE ILLUSTRATED EMBODIMENTS

Figure 1:
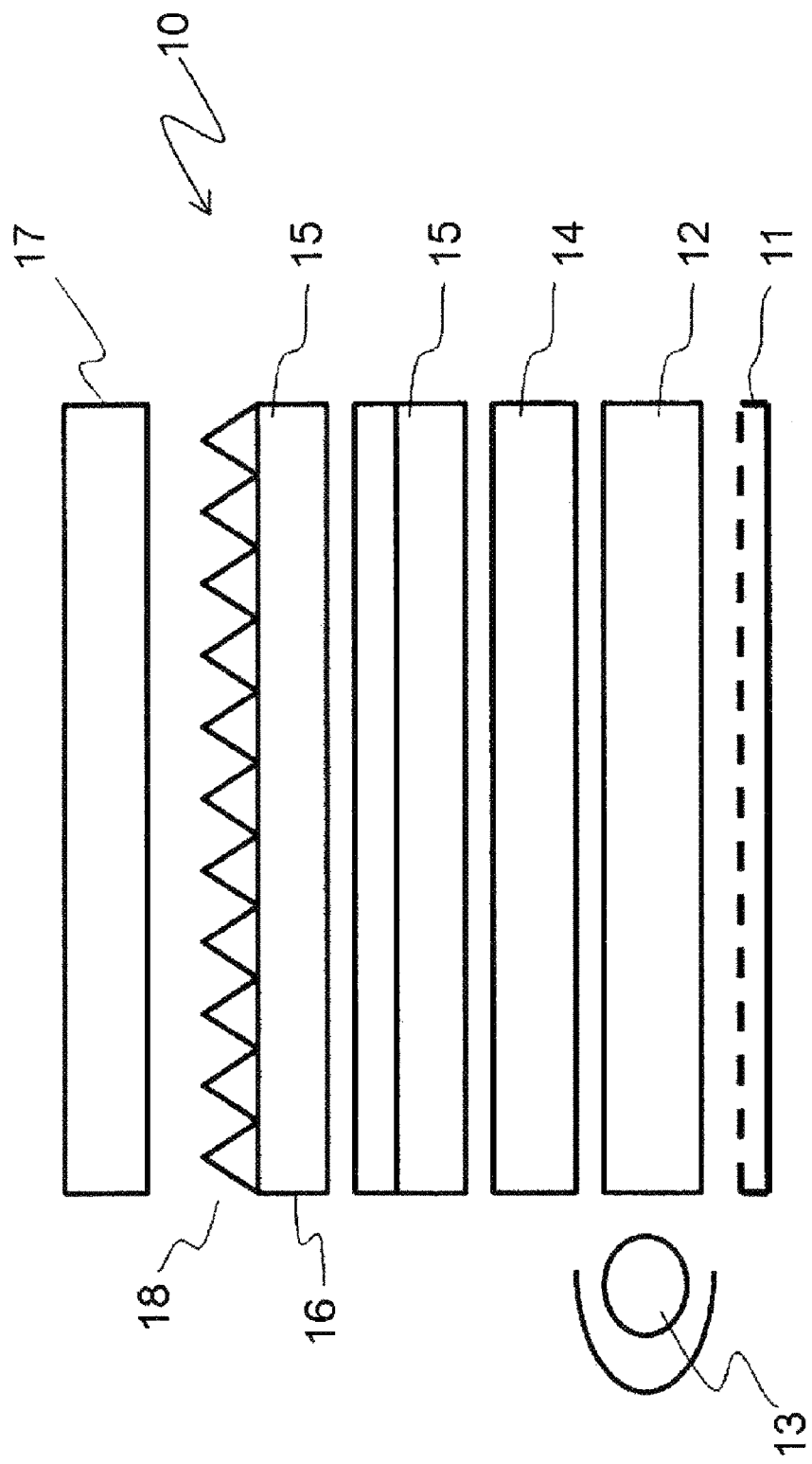
FIG. 1 schematically illustrates a sectional view of a prior art backlight module for LCD.

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by reference to the appended claims.

The present invention is directed to a luminance enhancement film (i.e. light redirecting film) comprising an optical substrate that possesses a structured surface that enhances luminance or brightness, and a support substrate that incorporates a dispersion of particles for light diffusion (or scattering). In accordance with the present invention, a separate particle layer is not required in addition to the support substrate layer. The particles are integrated in the support substrate layer. The light redirected by the support substrate with the particles has a less directionality than the light redirected by the support substrate without the particles.

In one aspect of the present invention, the particles are dispersed near at least one of the planar surfaces of the support substrate (i.e., the light input surface light output surface or both of the support substrate to provide optical diffusion. The optical diffusion aspect of the support substrate of the present invention is applicable to luminance enhancement films having optical substrates with various types of structured light output surfaces designed for luminance enhancements.

FIG. 8 illustrates an example of a flat panel display. A backlight LCD 110, in accordance with one embodiment of the present invention, comprises a liquid crystal (LC) display module 112, a planar light source in the form of a backlight module 114, and one or more luminance enhancement films 126 and 128 of the present invention interposed between the LC module 112 and the backlight module 114. The luminance enhancement films 126 and 128 may be similar. The LC module 112 comprises liquid crystals sandwiched between two transparent substrates, and control circuitry defining a two-dimensional array of pixels. The backlight module 114 provides planar light distribution, either of the backlit type in which the light source extends over a plane, or of the edge-lit type as shown in FIG. 8, in which a linear light source 116 is provided at an edge of a light guide 118. A reflector 120 is provided to recycle light from the light guide 118 back into the light guide 118. The light guide 118 is structured (e.g., with a tapered plate and light reflective and/or scattering surfaces defined on the bottom surface facing away from the LC module 112) to distribute and direct light through the top planar surface facing towards LC module 112.

In the illustrated embodiment, there are two luminance enhancement films 126 and 128, which are identical, in accordance with the present invention, which are arranged with the similar films offset by 90 degrees about an axis perpendicular to the plane of the films (e.g., for films having longitudinal prism structures, the films are arranged with the longitudinal prism structures generally orthogonal between the two films). The light entering the LC module 112 through the luminance enhancement films is diffused and directed uniformly spatially over the planar area of the LC module 112 and has relatively strong normal light intensity. The luminance enhancement films in accordance with the present invention may be used with LCDs to be deployed for displays, for example, for televisions, notebook computers, monitors, portable devices such as cell phones, PDAs and the like, to make the displays brighter.

FIG. 9A shows cross-section view of a support substrate 132 with particles 140 dispersed at its surfaces. While FIG. 9A shows the embodiment with particles at both opposing surfaces of the support substrate 132, it is understood that the particles 140 may be dispersed at only one of the surface of the support substrate 132 (e.g., without particles at the bottom surface, or the light input surface 146). The particles are dispersed into the one or both surfaces while the substrate 132 is being formed. The optical substrate 130 material is then adhered to the support substrate 132 and is embossed and cured to form the prism structures 135 and the two-layer multifunction film 126 shown in FIG. 9B. While FIG. 9B shows the base substrate 142 to be of uniform thickness, it may be of non-uniform thickness.

For ease of reference, the following orthogonal x, y, z coordinate system would be adopted for the various directions. As shown in FIG. 9B, the x-axis is in the direction across the peaks and valleys of the structured surface, also referred to as the lateral direction. The z-axis is perpendicular to the plane of the optical substrate 130. Light from the external light guide 118 is directed in the positive z-direction in the illustrated embodiment. The y-axis is orthogonal to the x-axis and z-axis, in the plane of the optical substrate 130. (For a rectangular piece of the optical substrate, the x and y-axes would be along the orthogonal edges of the substrate 130. The z-axis is orthogonal to the x and y-axes.)

The optical substrate 130 has a light input surface 142 that is planar and smooth, and a light output surface 144 that is structured (e.g., prismatic structures comprising longitudinal regular prism blocks 135 in the y-direction, and arranged in lateral rows (i.e., side-by-side in the x-direction) as shown in FIG. 9B). The prism blocks 135 are connected to adjoining prism blocks 135 in longitudinal and/or lateral directions. Because the prism blocks 135 are not in fact individual discrete blocks assembled together, the material of the prism blocks 135 are in a continuum or continuous monolithic structure, with no physical contact surfaces or joining surfaces per se.

In one embodiment of the present invention, the light output surface 144 and the light input surface 142 are generally parallel to each other in the overall optical substrate structure (i.e., do not form an overall substrate structure that is generally tapered like a light guide plate in a backlight module, or that is concave or convex).

The prism blocks 135 may be regular or irregular (as disclosed in co-pending U.S. patent application Ser. No. 11/450,145, commonly assigned to the assignee of the present invention, and is fully incorporated by reference herein). References to cross sections of a prism block 135 would be sections taken in x-z planes, at various locations along the y axis. Further, references to a horizontal direction would be in an x-y plane, and references to a vertical direction would be in the z-direction. In the illustrated embodiment, the prism blocks 135 are regular in geometry. The light input surface 142 lies in an x-y plane. The edge showing the ends of the lateral rows of the prism blocks 135 lies in the x-z plane, such as shown in FIG. 9B. The prism blocks 135 may possess a structure having structure, geometry and features that are disclosed in earlier filed co-pending U.S. patent application Ser. Nos. 11/450,145 and 11/635,802, which have been commonly assigned to the assignee of the present invention, and which had been incorporated by reference herein.

All the particles 140 may be embedded below the surface of the substrate 132, or some of the particles 140 may protrude above the surface of the substrate 132. In one embodiment of the present invention, the support substrate 132 may be a PET (polyethylene terephthalate) material. The PET substrate 132 used in the present invention is made using regular melt casting/stretching process. The PET substrate 132 is flexible and contains particles or beads 140 that are dispersed only close to its surface and form protrusions at the surface (i.e., the particle dispersed surface is not smooth). The particles 140 may be dispersed on one side (e.g., the light output side 148 of the support substrate 132) or both planar sides (i.e., the light input side 146 and the light output side 148) of the support substrate 132. The particles may cover a depth (i.e., the "a-region" thickness described later below) of 1-10%, preferably 1-5% of total substrate thickness at each of the planar surfaces of the substrate 132 where particles are present. Given particle sizes on the order of less than 1-30 µm, and a-region thickness of 1-5% of the support substrate thickness is on the order of less than 1-20 µm (i.e., the particle size is on the order of the a-region thickness, the particles are generally expected to protrude above the flat surface of the support substrate 132, unless for the smaller particles in relation to larger depth of the particle region at the surface. The protruded particles cause roughness at the light output surface 148 and light input surface 146 of the support substrate.

The particles 140 dispersed on the two sides of the support substrate 132 can be made same or different in terms of any or all of material, chemical and/or physical composition, average size, weight loading level, shape, surface properties, etc., and the a-region thickness and/or particle distribution density may be different on the two sides.

The particles and beads in the PET substrate 132 can be inorganic or organic in nature, i.e. Tio2, BaSO4, Silicone, SiO2, PS (polystyrene) or PMMA (polymethylmethacrylate). The characteristic, averaged size of particles and beads, as measured by known laser scattering method, can range from 1 to 30 µm. Unless otherwise specifically noted or is clear from the context of the disclosure hereinbelow, all references to particle or bead size refer to averaged size. The averaged size of particles and beads does not have to be uniform. All particles may be generally or substantially the same size, or have random sizes, or with a particular size distribution profile across the substrate and/or in depth in reference to the support substrate surface. For example, for cross-linked PMMA, cross-linked PS and silicone beads, the particle size can range from 1 to 30 µm within a support substrate, with a preferred range of 2 to 20 µm. For SiO2, TiO2 and BaSO4 particles, the particle sizes could vary from 0.3 to 5 µm, with preferred range of 1 to 3 µm. The afore-mentioned ranges are especially applicable to support substrates 132 having thickness ranging from about 25 µm to 350 µm. Accordingly, the particle size, and the thickness of the particle region (the "a-region" described below), are significantly smaller than the thickness of the support substrate 132.

Generally, more uniform particle size distribution would provide a more uniform light diffusion effect and higher light transmittance, but a non-uniform light diffusion effect may be intentionally achieved by selecting a desired size distribution (e.g., to complement a non-uniform light source, or to intentionally provide a desired non-uniform light intensity viewing appearance to a user.) As will be referenced below, "mono-dispersed" particles refer to particles having uniform bead size in the support substrate, and poly-dispersed" particles refer to particles having bead sizes within a certain size distribution in the support substrate. As the terms are applied herein, "mono-dispersed" particles are deemed to be particles having actual sizes ranging within a co-efficient of variation (CV) that is 15% of less.

In addition to particle size distribution, the particles 140 can be evenly distributed across the surface of the support substrate 132 or be distributed randomly across the surface of the substrate 132, or distributed with varying particle density profiles across the surface of the substrate 132. In the alternate or in addition, the particles 140 can be evenly distributed in depth near the surface of the substrate 132 or be distributed randomly in depth near the surface of the substrate 132, or distributed with varying particle density profiles in depth near the surface of the substrate 132. Further, vary density profiles may include particle density being higher closer to the surface than the interior of the substrate, or vice versa.

The shape of the particles 140 may be regular, irregular, symmetrical, or non-symmetrical, having random or specific geometrical shapes (e.g., spherical, ellipsoidal, rhomboid, disc, etc.). For example, inorganic beads, e.g., SiO2, BaSO4 and TiO2, may be randomly shaped. The organic beads, e.g., cross-linked PMMA and cross-linked PS or silicone, may be spherical, hollow or exotic shape (e.g., biconvex lens shape).

Figure 10A:
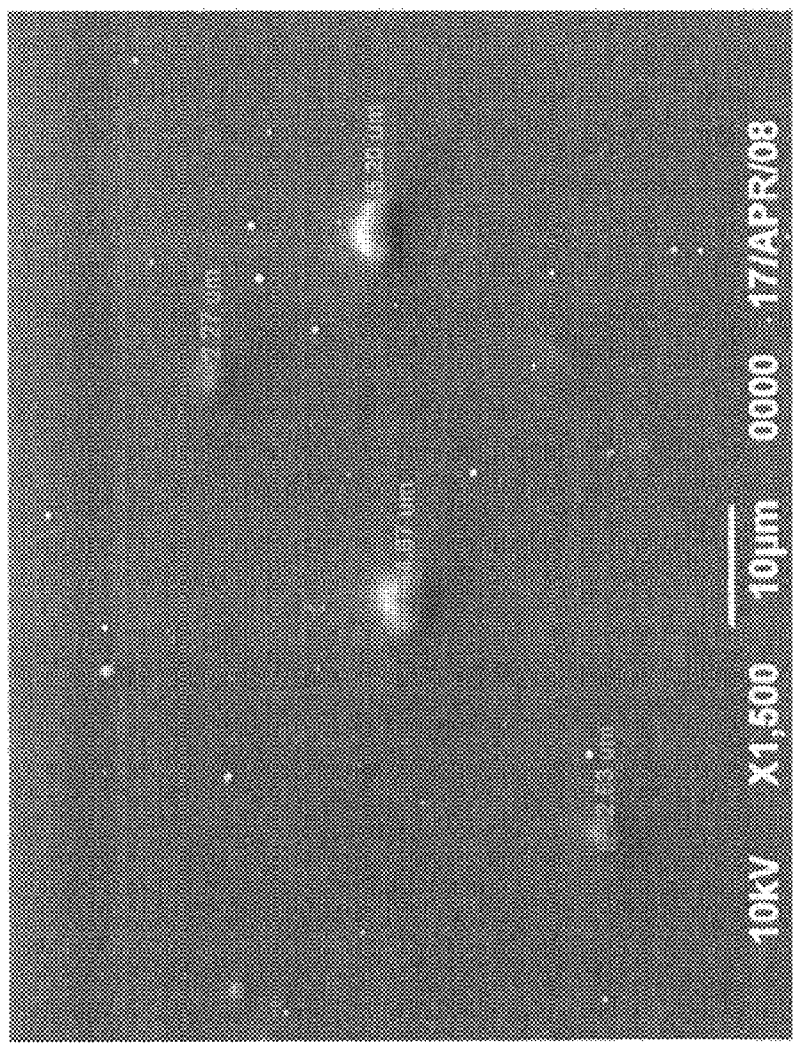
FIG. 10A is a SEM photograph of top view of a substrate incorporating a dispersion of particles in accordance with one embodiment of the present invention.
Figure 10B:
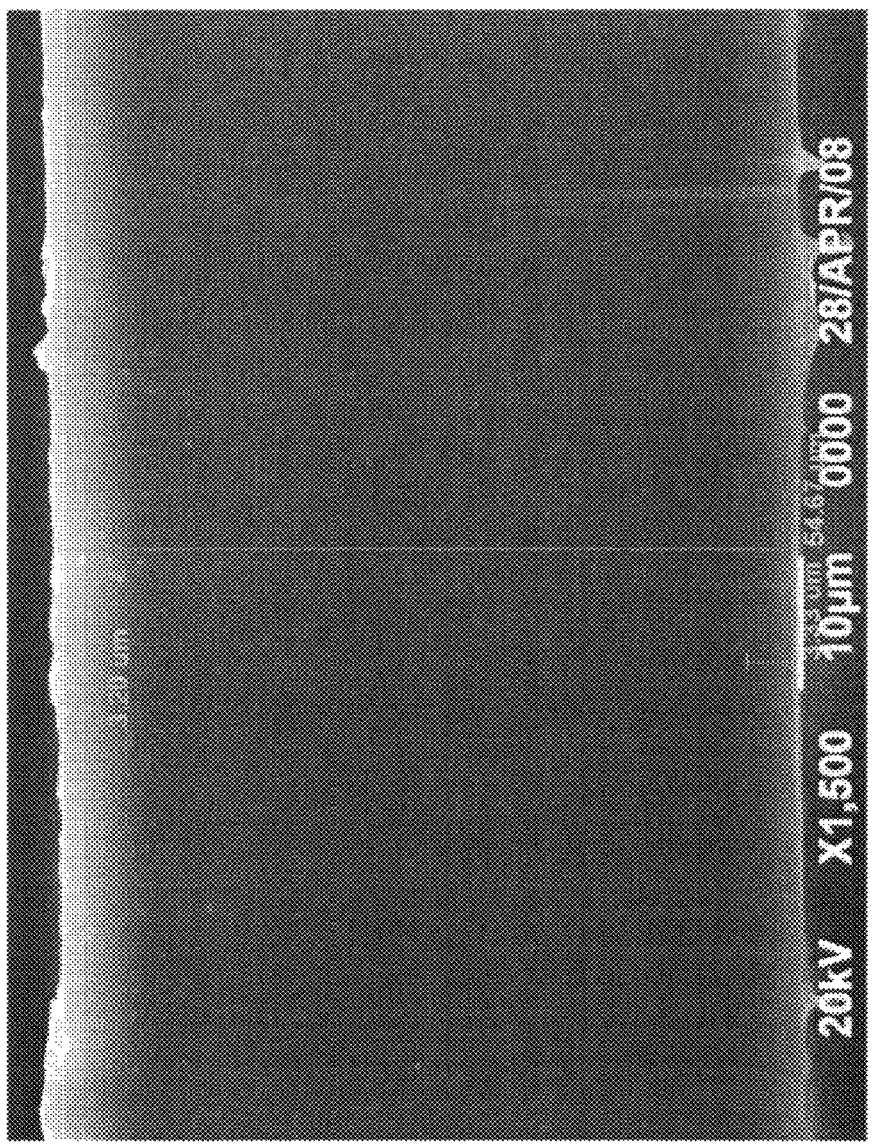
FIG. 10B is a SEM photograph of sectional view of the substrate in FIG. 10A.

FIGS. 10A and 10B show SEM photos of top view and cross-section view of a support substrate including a dispersion of particles at its surface. The tested material of the support substrate is PET and the particles used are SiO2. All the particles are spotted on the proximity of outer surface. The total particles used on each surface are 0.009% to 0.2% of total substrate weight. Alternatively, the amount of particles used is controlled by reference to volume of the particles.

The particles 140 have a white appearance under light. The surface of the particles 140 may be finished, e.g., polished, matte, painted, or coated.

The refractive index of exemplar materials for the substrate 132 and particle 140 include:
PET substrate ~1.50
Particles:
SiO2 ~1.46
BaSO4 ~1.65
TiO2 ~2.49
Cross-linked PMMA ~1.49
Cross-linked PS ~1.59
Silicone ~1.43

Several design criteria are being considered for the support substrate 132 and the resultant luminance enhancement film 126, including characteristics of the support substrate such as transmittance, diffusion, and haze, and optical gain (i.e., the light collection capability) of the resultant luminance enhancement film. Further, it is desired to eliminate Newton-ring effect and reduce rainbow effect in the support substrate.

Figure 12:
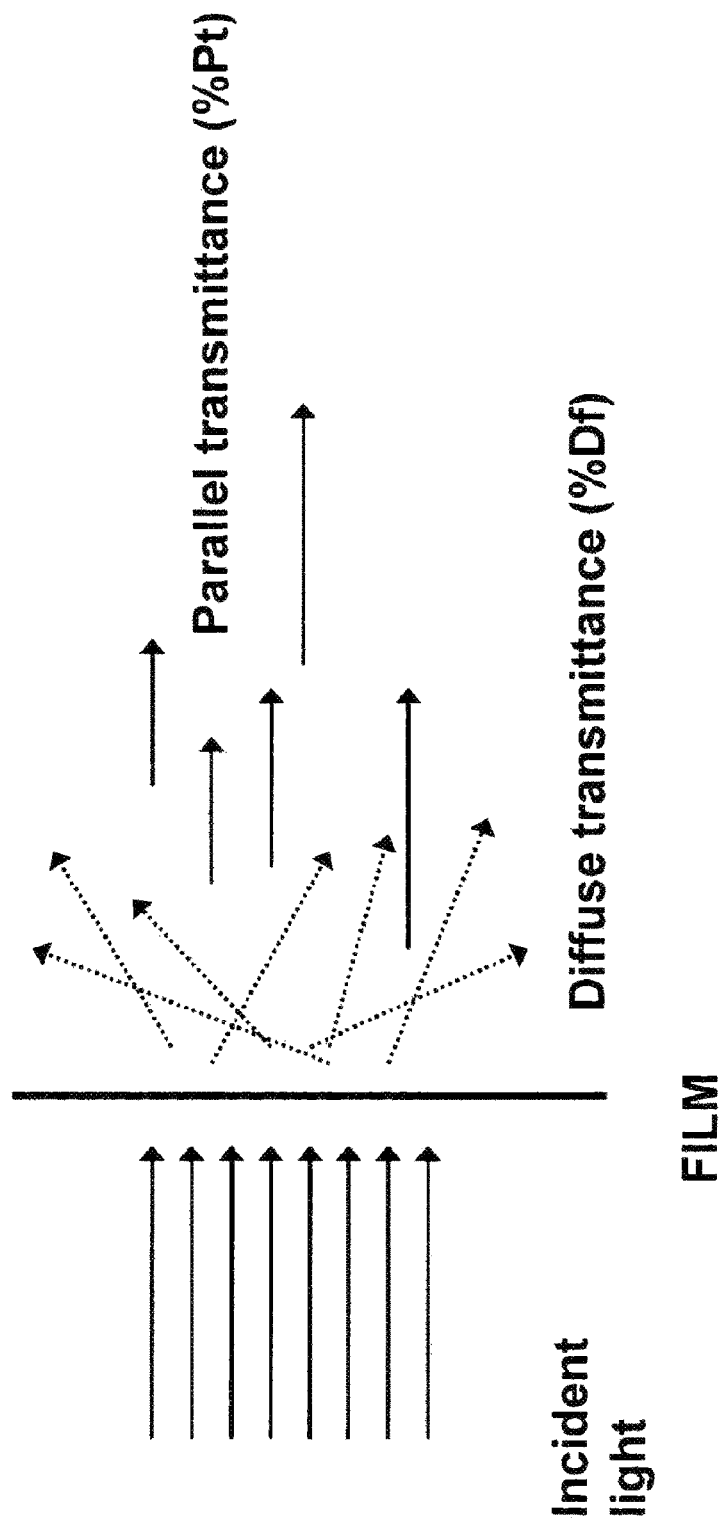
FIG. 12 is a schematic diagram explaining the components of total light transmittance through a film (e.g., support substrate, luminance enhancement film, etc.).

Referring to FIG. 12, the total light transmittance through a film (e.g., support substrate, luminance enhancement film, etc.) includes several components. As applied to the support substrate film, the total light transmittance includes a component of parallel transmitted light and a diffused transmitted light. In particular, total light transmittance (% Tt)= (Total light transmitted/incident light)×100=Parallel light transmittance (% Pt)+Diffuse light transmittance (% Df). In addition, Haze (Hz) is defined to be (% Df/% Tt)×100. Generally, for the support substrate 132 to provide effective diffusion effect, it is desirable to have as high a % Tt as possible, and with as high a % Df component as possible, or to have Hz to be as high as possible, but not to high as to significantly compromise Tt.

Several factors or parameters affect the transmittance and diffusion of the luminance enhancement film 126 of the present invention. Some of the parameters may include:

a. Ra of the surface of the support substrate 132 (Ra is defined, e.g., by Handbook of Surface Metrology, David J. Whitehouse, CRC Press (1994)). (Ra generally increases with increase in bead size, bead loading, and thickness of "a-region" (see below));

b. average size of the particles;

c. size variation and distribution of the particles (e.g., mono v. poly-dispersed);

d. density distribution of the particles;

e. loading (e.g., wt %) of particles in the support substrate (e.g., 1-10%);

f. properties of layers of the support substrate (e.g., particles at only one planar side of the support substrate (i.e., abb-type substrate), or particles at both sides of the support substrate (i.e., aba-type substrate). The designation of "a" refers to a surface region within the support substrate with particles, "b" refers to the core region and/or surface region within the support substrate without particles. There is however no boundary, physical or chemical, between the "a" and "b" regions. The "a" and "b" regions are in a continuum or continuous, unitary or monolithic structure, with no physical contact surfaces or joining surfaces per se between the region. Accordingly, abb-type substrate refers to a support substrate having a surface region having particles, a core region of no particle, and another surface region of no particle; aba-type substrate refers to a support substrate having a core region of no particle sandwiched by two surface regions having particles.);

g surface properties of particles (e.g., reflective and refractive properties), h. average thickness or depth of particle region near surface (i.e., thickness of the a-region or a-"layer"), i. shape of particles.

Generally, in order to improve the light transmittance through the substrate 140, the surface of beads/particles 140 can be chemically modified to make its surface refractive index closer to that of the material of the substrate 140. The surface of the particles 140 may also be reflective (e.g., with a polished or coated surface, or made reflective based on difference in refractive indices of the particles and substrate.) Both differences in refractive indices and size and shape of particle/bead 140 affect the diffusion effect of the particles 140 at the surface of the support substrate 132. The difference in refractive indices and size and shape of particle/bead 140 will be the main factors on determining the effectiveness of diffusion. The location of particle/bead 140 is a lesser factor.

In the illustrated embodiment, the average surface roughness (Ra) of the particle dispersed PET substrate 132 is between 0.1 and 1 μm (e.g. based on ISO4287). The transparent material may be flexible and of materials including but not limited to PET and polycarbonate. The material may be clearly transparent or may have a color to it. The transparent material may also be rigid and of materials including but not limited to PET, acrylic and polycarbonate and its co-polymers.

Based on experiments conducted comparing support substrates (of PET material) by varying various structural parameters, and further comparing the resultant luminance enhancement films incorporating the respective support substrates, the following relative effects were observed:

a. Effects of aba-type vs. abb-type support substrates: Comparing two 50 μm thick support substrates, having 3 μm poly-dispersed PMMA beads, with comparable particle a-region thickness (e.g., about 1.5 μm) and Ra of the support substrate surface, and other comparable parameters, similar % Df and haze can be achieved with less total bead loading for the abb-type support substrate (e.g., 5% bead loading for the abb-type and 4% bead loading for each planar side of the aba-type (total 8%)), and with more effective Newton-ring elimination. In other words, for abb-type, Newton-ring can be eliminated by using less beads.

b. Effects of a-region thickness: Comparing two 50 μm thick abb-type support substrates, both having 3 μm poly-dispersed PMMA beads, and 5 wt % loading of particles with comparable Ra of the support substrate surface, and other comparable parameters, increasing the thickness of the particle region (i.e., the a-region or a-layer) near the surface of the support substrates (e.g., from 1.56 to 2.20 μm) would only slightly increases % Df. However, it has been found that in the resultant luminance enhancement films, the one with the support substrate having the thicker a-region has a lower optical gain.

c. Effects of bead type: Comparing three 50 μm thick, abb-type support substrates respectively having poly-dispersed PMMA, mono-dispersed PMMA, and mono-dispersed PS particles, with about 5 wt % loading of particles, and about similar 1.5 μm a-region thickness, about similar 3 μm average size beads, with comparable Ra of the support substrate surface, and other comparable parameters, the results show (i) the mono-dispersed particles show better diffusion effect, and (ii) the mono-dispersed PS particles provide slightly higher haze and % Df then mono-dispersed PMMA, but provides higher optical gain in the resultant luminance enhancement films. It also appears that there is no correlation between % Df of the support substrate and optical gain of the resultant luminance enhancement film.

d. Effects of bead size and a-region thickness: Comparing three 125 μm thick aba-type support substrates, all with about 3 wt % loading of poly-dispersed PMMA beads, having 3 μm, 6 μm and 6 μm bead sizes, respectively, at each of both planar sides of the respective support substrates, and other comparable parameters, the results show (i) the effect of diffusion decreases when the average bead size increase, (ii) with same type of beads, % Df can be increased by increasing the a-region thickness (e.g. from 2.7 to 5.5 μm); (iii) the bead size show little effect on rainbow effect, and (iv) the rainbow effect can be suppressed by increasing the a-region thickness, but that would reduce the optical gain in the resultant luminance enhancement film.

e. Effects of aba-type vs. abb-type for 125 μm substrates: Comparing three 125 μm thick support substrates, having 3 μm poly-dispersed PMMA beads, with 3% bead loading of 2.72 μm a-region thickness at each of the two planar surfaces of the aba-type, 6% bead loading at 3.9 μm a-region thickness at one surface of a first abb-type and 10% at 3.9 μm a-region thickness at one surface of a second abb-type, the results show (i) with the same % bead loading, abb-type has lower % Df and haze, but resultant luminance enhancement film with the abb-type film has similar % Df and shows better reduction of rainbow effect, (ii) increase in loading of beads can eliminate rainbow effect completely, but the optical gain of resultant luminance enhancement films will be reduced.

f. Effects of aba-type vs. abb-type for 125 μm substrates: Comparing two 125 μm thick support substrates, having 6 μm poly-dispersed PMMA beads, with 3% bead loading of 2.72 μm a-region thickness at each of the two planar surfaces of the aba-type, 3% bead loading at 3.9 μm a-region thickness at one surface of the abb-type, the results show (i) with only one a-region in the abb-type (i.e., less total bead loading), the % Df is reduced without affecting % Tt, and (ii) the Newton-ring is not present even with half the total bead loading for the abb-type. Further, the optical gain of the resultant luminance enhancement films is improved for the abb-type. g. Effects of bead type for 125 μm substrates: Comparing two 125 μm thick support substrates having poly-dispersed PMMA particles at 3.9 μm a-region thickness, with 3% loading of poly-dispersed PMMA of 6 μm bead size and 4.5% loading of mono-dispersed PMMA of 5 μm bead size, the results show comparable % Tt for both substrates, but slightly lower % Df for the larger bead size. However, for the resultant luminance enhancement films, the overall optical gains are comparable between the two.

h. Effects of particle loading: Comparing two 100 μm thick abb-type support substrates having mono-dispersed PS particles of 5 μm bead size at 3.1 μm a-region thickness, between 3.5% loading and 5.5% loading, the results show the increase of bead loading increases % Df and haze as expected.

i. Effects of bead loading on rainbow elimination: It has been found that the bead loading needs to reach certain threshold level (e.g., between 3.5 to 5.5%) in order to suppress the rainbow effect.

j. Effects of particle size for 188 μm substrate: Comparing two 188 μm thick abb-type support substrates, both with 3 wt. % loading of poly-dispersed PS beads, having 6 μm and 8 μm bead sizes, respectively, at one planar side of the respective support substrates, the results show for the same bead loading and a-region thickness, Ra increases with larger particle size.

In addition to the above experiments, it is expected that the prism structure selected in the optical substrate of the luminance enhancement film could affect various optical effects, including rainbow effect. However, the overall optical gain could be affected as a result. However, it is expected that rainbow can be eliminated with PET film design regardless of prism type.

The prism structures at the structured optical substrate 130 may be imperfect, meaning that the peaks of the prisms may be at a decreasing angle, may be rounded, or may be smoothed by a variable radius curve in proximity of the peak. This may be an advantage for decreasing the damage to the patterned materials in handling. It may also be an advantage for softening the drop-off in brightness from the relatively sharp cut-off that can be theoretically achieved by use of perfect prism structures.

In one embodiment, the particles/beads 140 can be metered into the support substrate 132 by pre-mixing with melted PET resin through a separate PET resin supply channel of the substrate forming equipment, and forming on the surface when the pre-substrate is being bi-axially stretched. Other than the application of particles into the mix, this process is known to those skilled in the art.

The multifunctional luminance prism sheet is preferably produced in a UV Cast-Cure process that is well known to those skilled in the art. The prism pattern is placed on the support substrate 132 by use of a roll that has been machined with the negative shape of the pattern. This pattern on the roll is created by diamond turning the pattern on the roll using techniques that are well known to those skilled in the art.

Alternative production techniques include extrusion, UV-cast-cure coating, calendaring, embossing, injection molding and compression-injection molding. Tools may be in the form of rolls, belts or mold plates or mold inserts. Techniques for forming the pattern on the tools include but are not limited to use of diamond tipped tools as in diamond turning, lithography, laser ablation, extrusion or laser cutting.

As an example to illustrate the relative dimensions of an optical substrate in accordance with the present invention, the peak heights are on the order of 10 to 200 micrometers, the valley heights (bottom thickness) are on the order of 0.3 to 10 micrometers. The foregoing dimensions are intended to illustrate the fact that the structured surface features are microstructures, in the micrometers range. By way of example, the overall size of the area of the luminance enhancement film may vary on the order of 2 mm to 10 m in both width and length (and even larger dimensions possible), depending on the particular application (e.g., in a flat panel display of a cellular phone, or in a significantly larger flat panel display of a TV monitor). The characteristic size of the prism blocks on the structured surface of the optical substrate need not change appreciably with different overall optical substrate size.

The structured surface 144 of optical substrate 130 may be generated in accordance with a number of process techniques, including micromachining using hard tools to form molds or the like for the prismatic profile having the predefined structural irregularities described above. The hard tools may be very small diamond tools mounted on CNC (Computer Numeric Control) machines (e.g. turning, milling and ruling/shaping machines). Furthermore, known STS (Slow Tool Servo) and FTS (Fast Tool Servo) are examples of the devices. U.S. Pat. No. 6,581,286, for instance, discloses one of the applications of the FTS for making grooves on an optical film by using thread cutting method. To provide predefined structural irregularities, these machines may include certain perturbation means to assist the tools moving with small shifts and making prisms, and hence non-facet flat irregularities having different levels of irregularities. Known STS, FTS may include ultrasonic vibration apparatus to provide perturbation or vibration to accomplish structural irregularities predefined in the mold. By using the devices to form surfaces in the mold in relation to increasing degrees of freedom, three-dimensionally varying regular and/or irregular prisms and flats of the structured surfaces of the optical substrates disclosed above can be obtained.

The master may be used to mold the optical substrate 130 directly or used in electroforming a duplicate of the master, which duplicate is used to mold the optical substrate. The mold may be in the form of a belt, a drum, a plate, or a cavity. The mold may be used to form the prismatic structure on a substrate through hot embossing of the substrate, and/or through the addition of an ultraviolet curing or thermal setting materials in which the structures are formed. The mold may also be used to form the optical substrate through injection molding. The substrate or coating material may be any organic, inorganic or hybrid optically transparent material and may include suspended diffusion, birefringence or index of refraction modifying particles.

Figure 11:
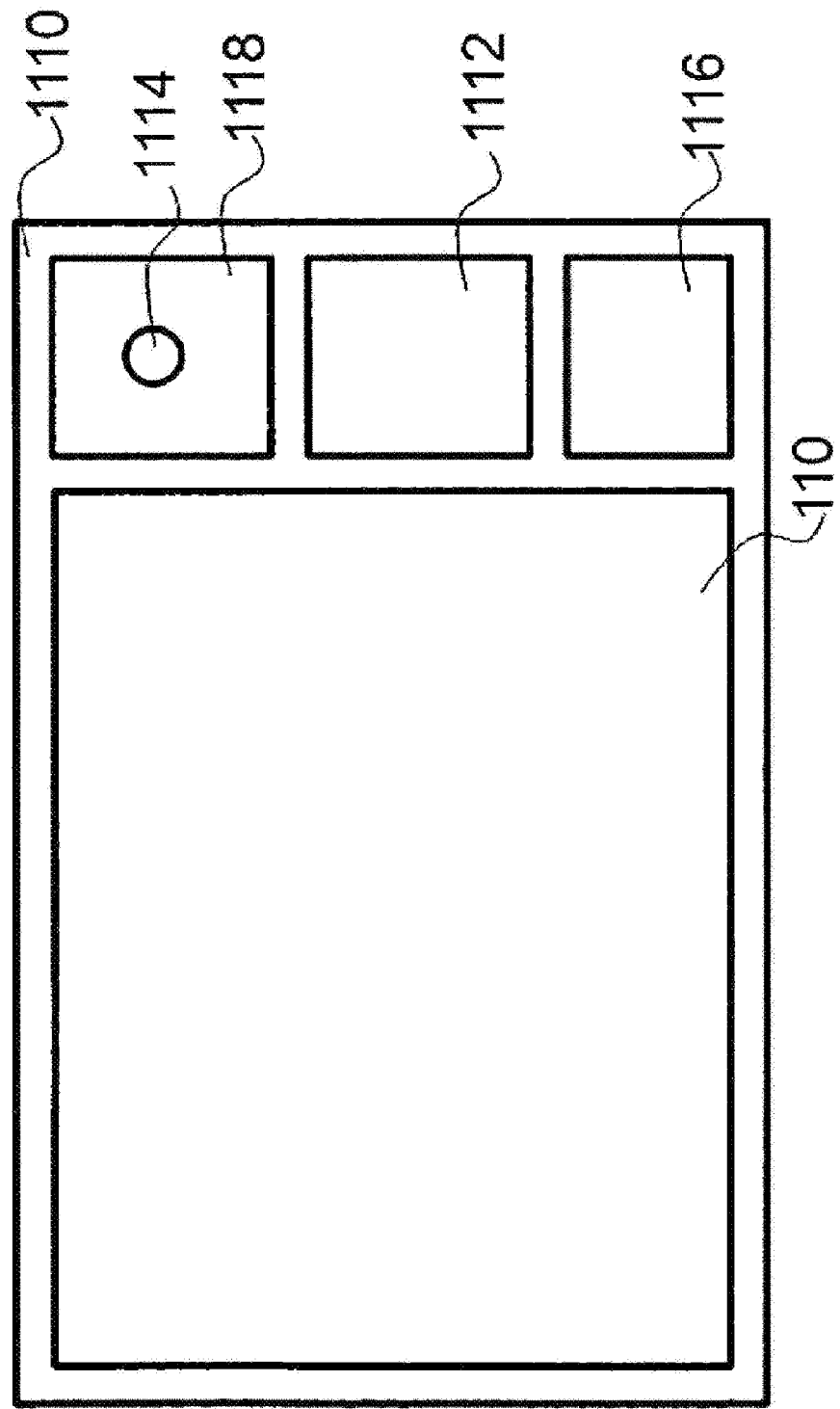
FIG. 11 is a schematic view of an electronic device comprising an LCD panel that incorporates the inventive luminance enhancement film of the present invention, in accordance with one embodiment of the present invention.

In accordance with one embodiment of the present invention, the LCD 110 in FIG. 8 incorporating the inventive luminance enhancement film in accordance with the present invention may be deployed in an electronic device. As shown in FIG. 11, an electronic 1110 (which may be one of a PDA, mobile phone, television, display monitor, portable computer, refrigerator, etc.) comprises the inventive LCD 110 (FIG. 8) in accordance with one embodiment of the present invention. The LCD 110 comprises the inventive optical substrate described above. The electronic device 1110 may further include within a suitable housing, a user input interface such as keys and buttons (schematically represented by the block 1116), image data control electronics, such as a controller (schematically represented by block 1112) for managing image data flow to the LCD panel 110, electronics specific to the electronic device 1110, which may include a processor, A/D converters, memory devices, data storage devices, etc. (schematically collectively represented by block 1118), and a power source such as a power supply, battery or jack for external power source (schematically represented by block 1114), which components are well known in the art.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A method of forming a light enhancement film, wherein the light enhancement film has a light input surface and a light output surface opposite to the light input surface, wherein the method comprises:
   providing a support substrate comprising a unitary body made of an organic material, wherein the unitary body has a first surface and a second surface opposite to the first surface, wherein the first surface defines the light input surface of the light enhancement film;

mixing a plurality of organic particles and a plurality of inorganic particles to form mixed particles, wherein the plurality of organic particles and the plurality of inorganic particles are used for light-diffusing;

adding the mixed particles into the unitary body, wherein the plurality of inorganic particles are mixed with the plurality of organic particles to increase degree of uniformity of the plurality of inorganic particles in the unitary body made of the organic material; and forming a structured layer on the unitary body, wherein the structured layer has a third surface and a fourth surface opposite to the third surface, wherein the third surface of the structured layer is disposed on the second surface of the unitary body and the fourth surface defines the light output surface of the light enhancement film.

2. The method according to the claim 1, wherein the material of the unitary body is different from the material of the structured layer.

3. The method according to the claim 1, wherein the organic material is PET.

4. The method according to the claim 1, wherein the mixed particles are disposed in a surface region of the first surface of the unitary body, wherein the thickness of the surface region is smaller than the thickness of the unitary body.

5. The method according to the claim 1, wherein the mixed particles are disposed in a region of the unitary body below the first surface of the unitary body, wherein the thickness of the region is smaller than the thickness of the unitary body.

6. The method according to the claim 1, wherein the mixed particles are disposed in a surface region of the second surface of the unitary body, wherein the thickness of the surface region is smaller than the thickness of the unitary body.

7. The method according to the claim 1, wherein at least one portion of the mixed particles protrude from the first surface of the unitary body so as to cause roughness in the first surface of the unitary body.

8. The method according to the claim 1, wherein the particle density of the mixed particles varies in a thickness direction of the unitary body.

9. The method according to the claim 8, wherein the unitary body comprises a first point and a second point closer to the first surface of the unitary body than the first point, wherein the particle density at the first point is larger than the particle density at the second point.

10. The method according to the claim 8, wherein the unitary body comprises a first point and a second point closer to the first surface of the unitary body than the first point, wherein the particle density at the first point is smaller than the particle density at the second point.

11. A light enhancement film having a light input surface and a light output surface opposite to the light input surface, comprising:

a support substrate comprising a unitary body having a first surface and a second surface opposite to the first surface, wherein the first surface defines the light input surface of the light enhancement film; and a structured layer having a third surface and a fourth surface opposite to the third surface, wherein the third surface of the structured layer is disposed on the second surface of the unitary body and the fourth surface defines the light output surface of the light enhancement film;

wherein the unitary body is made of an organic material and comprises mixed particles composed of a plurality of organic particles and a plurality of inorganic particles, wherein the plurality of organic particles and the plurality of inorgoanic particles are used for light-diffusing, wherein the plurality of inorganic particles are mixed with the plurality of organic particles to increase degree of uniformity of the plurality of inorganic particles in the unitary body made of the organic material.

12. The light enhancement film according to the claim 11, wherein the material of the unitary body is different from the material of the structured layer.

13. The light enhancement film according to the claim 11, wherein the organic material is PET.

14. The light enhancement film according to the claim 11, wherein the mixed particles are disposed in a surface region of the first surface of the unitary body, wherein the thickness of the surface region is smaller than the thickness of the unitary body.

15. The light enhancement film according to the claim 11, wherein the mixed particles are disposed in a region of the unitary body below the first surface of the unitary body, wherein the thickness of the region is smaller than the thickness of the unitary body.

16. The light enhancement film according to the claim 11, wherein at least one portion of the mixed particles protrude from the first surface of the unitary body so as to cause roughness in the first surface of the unitary body.

17. The light enhancement film according to the claim 11, wherein the particle density of the mixed particles varies in a thickness direction of the unitary body.

18. The light enhancement film according to the claim 17, wherein the unitary body comprises a first point and a second point closer to the first surface of the unitary body than the first point, wherein the particle density at the first point is larger than the particle density at the second point.

19. The light enhancement film according to the claim 17, wherein the unitary body comprises a first point and a second point closer to the first surface of the unitary body than the first point, wherein the particle density at the first point is smaller than the particle density at the second point.

20. An optical film, comprising:

a support substrate comprising a unitary body having a first surface and a second surface opposite to the first surface; and a structured layer having a third surface and a fourth surface opposite to the third surface, wherein the third surface of the structured layer is disposed on the second surface of the unitary body;

wherein the unitary body is made of an organic material and comprises mixed particles composed of a plurality of organic particles and a plurality of inorganic particles, wherein the plurality of organic particles and the plurality of inorganic particles are used for light-diffusing, wherein the plurality of inorganic particles are mixed with the plurality of organic particles to increase degree of uniformity of the plurality of inorganic particles in the unitary body made of the organic material.

* * * * *